United States Patent
Roehrle et al.

(10) Patent No.: US 9,871,560 B2
(45) Date of Patent: Jan. 16, 2018

(54) ELECTRONIC DEVICE AND COMMUNICATION METHOD FOR NFC

(71) Applicant: SONY CORPORATION, Tokyo (JP)

(72) Inventors: Klaus Roehrle, Ostfildern (DE); Yo Tabayashi, Stuttgart (DE); Meik Buscemi, Reichenbach (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/127,808

(22) PCT Filed: Mar. 27, 2015

(86) PCT No.: PCT/EP2015/056704
§ 371 (c)(1),
(2) Date: Sep. 21, 2016

(87) PCT Pub. No.: WO2015/144879
PCT Pub. Date: Oct. 1, 2015

(65) Prior Publication Data
US 2017/0104511 A1    Apr. 13, 2017

(30) Foreign Application Priority Data
Mar. 28, 2014 (EP) .................................. 14162305

(51) Int. Cl.
*H04B 5/00* (2006.01)
*H04W 74/00* (2009.01)
*H04W 88/02* (2009.01)

(52) U.S. Cl.
CPC ........ *H04B 5/0031* (2013.01); *H04W 74/002* (2013.01); *H04W 88/02* (2013.01)

(58) Field of Classification Search
CPC .. H04B 5/0031; H04W 74/002; H04W 4/008; H04W 88/02
(Continued)

(56) References Cited

U.S. PATENT DOCUMENTS

2009/0247077 A1  10/2009  Sklovsky et al.
2011/0111778 A1  5/2011   Son et al.
(Continued)

FOREIGN PATENT DOCUMENTS

CN       1933438 A      3/2007
EP       2 106 107 A1   9/2009
(Continued)

OTHER PUBLICATIONS

"The Trusted Execution Environment: Delivering Enhanced Security at a Lower Cost to the Mobile Market," GlobalPlatform, White Paper, XP-002716538, Feb. 2011, 26 pages.
(Continued)

*Primary Examiner* — Eugene Yun
(74) *Attorney, Agent, or Firm* — Oblon, McClelland, Maier & Neustadt, L.L.P.

(57) ABSTRACT

An electronic device, for example for near field communication (NFC), includes a device host including an operating system (OS), a trusted execution environment (TEE), and a near field communication (NFC) controller configured to enable communication of the electronic device with other devices. The NFC controller is coupled to the device host by a data channel for data exchange and a control channel for control information exchange, and the control channel is provided between the TEE and the NFC controller.

13 Claims, 3 Drawing Sheets

(58) Field of Classification Search
USPC .......................................................... 455/41.1
See application file for complete search history.

(56) References Cited

U.S. PATENT DOCUMENTS

| | | |
|---|---|---|
| 2012/0159105 A1 | 6/2012 | von Behren et al. |
| 2013/0111207 A1 | 5/2013 | von Behren et al. |
| 2013/0217323 A1 | 8/2013 | Bhatia et al. |
| 2013/0281058 A1 | 10/2013 | Obaidi et al. |
| 2014/0022060 A1 | 1/2014 | Boehler et al. |

FOREIGN PATENT DOCUMENTS

| | | |
|---|---|---|
| EP | 2 690 839 A1 | 1/2014 |
| WO | WO 2010/008249 | 1/2010 |
| WO | WO 2013/188830 A1 | 12/2013 |

OTHER PUBLICATIONS

International Search Report and Written Opinion issued Jun. 9, 2015 in PCT/EP2015/056704 filed Mar. 27, 2015.

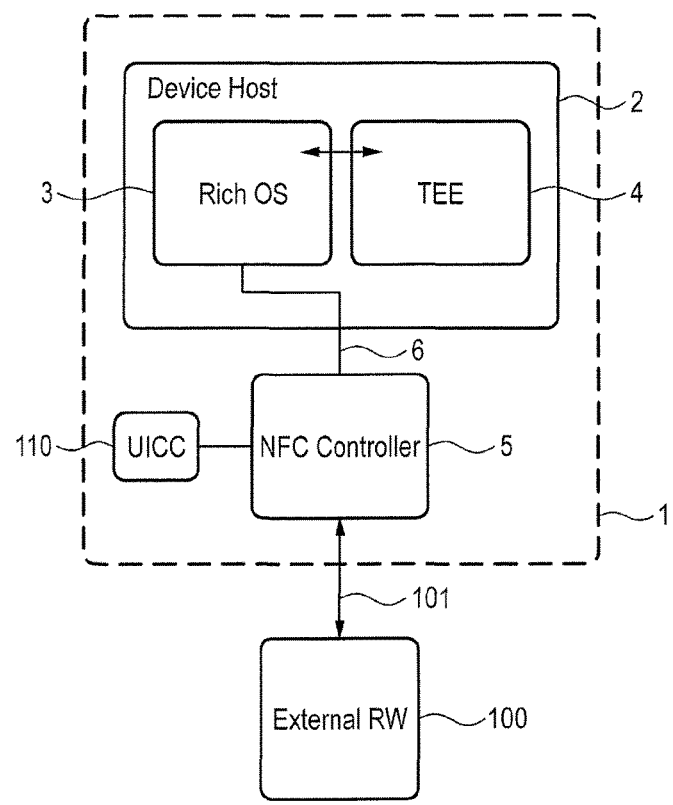
Fig. 1
CONVENTIONAL
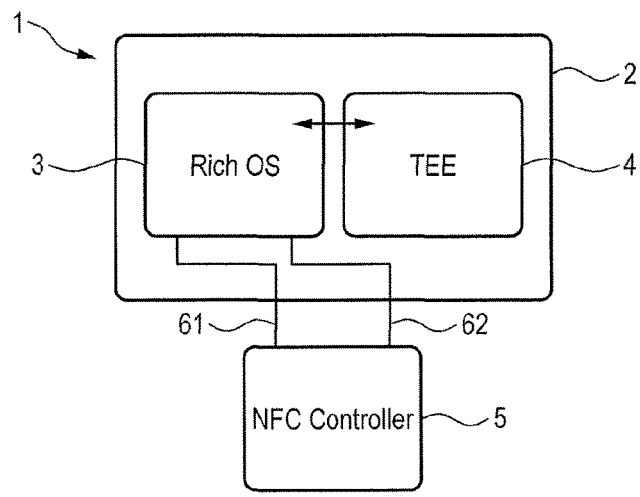
Fig. 2
CONVENTIONAL

ELECTRONIC DEVICE AND COMMUNICATION METHOD FOR NFC

CROSS-REFERENCE TO RELATED APPLICATIONS

The present application is based on PCT filing PCT/EP2015/056704 filed Mar. 27, 2015, and claims priority to European Patent Application 14162305.8 filed by the European Patent Office on 28 Mar. 2014, the entire contents of each of which being incorporated herein by reference.

BACKGROUND

Field of the Disclosure

The present disclosure relates to an electronic device, an electronic host device and a communication method for an electronic device, in particular to a near field communication (NFC) device and method for near field communication.

Description of Related Art

The NFC Forum, a non-profit industry association whose member organizations share development, application, and marketing expertise to develop the best possible solutions for advancing the use of NFC, has defined the NFC controller interface in "NFC CONTROLLER INTERFACE (NCI)", Technical Specification, Version 1.1, Oct. 25, 2013, which describes different mechanisms to configure the NFC controller (NFCC) and to exchange data with the NFC controller and other entities within a device. On the other hand, GlobalPlatform, another cross industry, non-profit association which identifies, develops and publishes specifications that promote the secure and interoperable deployment and management of multiple applications on secure chip technology, is working on standardizing APIs for a trusted execution environment (TEE). The TEE offers a more secure environment in which also signed applications can run. In addition GlobalPlatform is also working on defining secure element access control mechanisms.

Within an electronic device (e.g. a mobile handset) the NFC controller is configured with routing information in order to allow routing of incoming information (e.g. incoming frames) from an input interface (e.g. an RF interface) to secure elements (SE, e.g. a universal integrated circuit card (UICC)) or the device host (DH), which is generally running on the application processor of the electronic device. Current solutions assume that the device host is responsible for such a configuration. In addition, operating systems (OS) within a device can implement a secure element access control function which can filter the communication with secure elements and based on rules from the secure element forward or block the communication.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an electronic device, an electronic host device and a communication method for an electronic device, in particular for near field communication, which provide a more secure environment, in particular against malware attacks.

According to an aspect there is provided an electronic device comprising
a device host comprising an operating system, OS, unit and a trusted execution environment, TEE, unit, and
a near field communication, NFC, controller configured to enable communication of the electronic device with other devices, said NFC controller being coupled to the device host by a data channel for data exchange and a control channel for control information exchange,
wherein the control channel is provided between the TEE unit and the NFC controller.

According to a further aspect there is provided an electronic host device comprising
a device host comprising an operating system, OS, unit and a trusted execution environment, TEE, unit,
a first interface for exchanging data over a data channel provided between the host device and a near field communication, NFC, controller configured to enable communication of the electronic device with other devices, and
a second interface for exchanging control information over a control channel between the TEE unit and the NFC controller.

According to a further aspect there is provided a communication method for an electronic device comprising
establishing a data channel between the NFC controller and the device host for enabling data exchange between the NFC controller and the device host,
establishing a control channel between the NFC controller and the device host for control information exchange, wherein the control channel is established between the TEE unit and the NFC controller.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed electronic host device, the disclosed method, the disclosed computer program and the disclosed computer-readable recording medium have similar and/or identical preferred embodiments as the claimed device and as defined in the dependent claims.

The NFC Controller Interface (NCI) defined by the NFC Forum describes two channels between the device host and the NFC controller, i.e. a data channel for the data exchange and a control channel for control information exchange. The data channel can use different logical connections. By splitting the two channels and coupling the control channel to the TEE unit rather than to the OS unit, as conventionally done, i.e. by moving the control channel end point and optionally data channel endpoint to the TEE unit and thus moving part of the NCI handling into the TEE unit, a higher level of security for secure element access control and control data exchange (in particular of NFC routing configuration information), which are sensitive areas and shall be protected against malware attacks as much as possible, is provided resulting in a more secure environment.

It shall be noted that the device host and the NFC controller may be implemented as separate semiconductor devices/chips. For instance, the device host may be implemented as electronic host device (sometimes also called application processor) as also disclosed herein as separate element, and the NFC controller may be implemented as NFC chip. In other embodiments both the device host and the NFC controller may be implemented as a common semiconductor device/chip. For instance, the device host and the NFC controller may be implemented as common application processor, i.e. the NFC controller may be integrated into the application processor that previously only implemented the device host.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 shows a schematic diagram of a conventional electronic device,

FIG. 2 shows a schematic more detailed diagram of a conventional electronic device.

DETAILED DESCRIPTION OF THE EMBODIMENTS

Figure 3:
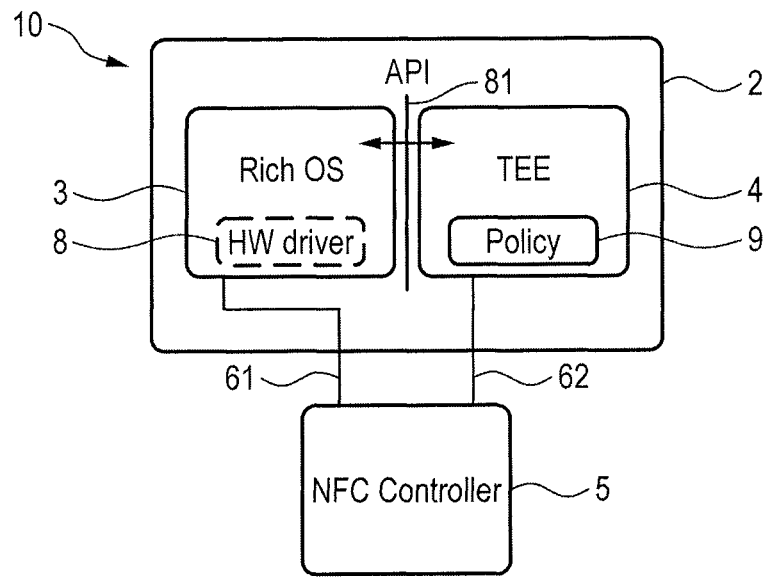
FIG. 3 shows a schematic diagram of a first embodiment of an electronic device according to the present disclosure.

The present disclosure is going to be described in the context of a mobile handset as an exemplary, non-limiting embodiment of an electronic device. However, it is not limited to mobile handsets, but is applicable to any electronic device incorporating a near field communication (NFC) controller and a device host with trusted execution environment (TEE) capabilities. Referring now to the drawings, wherein like reference numerals designate identical or corresponding parts throughout the several views, FIG. 1 shows a schematic diagram of a conventional electronic device 1. The device 1 comprises a device host 2 comprising an operating system (OS) unit 3 and a TEE unit 4. The device 1 further comprises an NFC controller 5 for enabling communication of the electronic device 1 with other external devices 100, e.g. via an RF communication channel 101, or internal devices 110, e.g. secure elements (e.g. SIM, UICC cards), e.g. via a logical connection as e.g. defined by ETSI SCP Host Controller Interface (HCI, TS 102 622). The NFC controller 5 is coupled to the device host 2 by an NFC controller interface (NCI) 6, in particular a physical interface, which can be UART (Universal Asynchronous Receiver Transmitter) on top of which NCI is provided as logical protocol.

The current version of the above mentioned NCI specification assumes the NCI 6 between the NFC controller 5 and the device host 2 (which is the application processor) to end in the OS unit 3 (e.g. a so called Rich OS (e.g. Android)). FIG. 2 shows a more detailed embodiment of the conventional device 1 illustrating that the NCI 6 comprises two logical NCI channels, i.e. a data channel 61 and a control channel 62, which both end at the OS unit 3.

The data channel 61 is provided for data exchange, i.e. is using so-called logical connections to transfer data to or from the NFC controller 5. Based on the logical connection the NFC controller 5 forwards the data either to or from the RF communication channel 101 or another entity (not shown) within the electronic device 1, e.g. to secure elements including an UICC. The control channel 62 is provided for control information exchange, i.e. is used to configure the NFC controller 5 and also to establish the logical connections.

FIG. 3 shows a schematic diagram of a first embodiment of an electronic device 10 according to the present disclosure. In this embodiment the data channel 61 connects the OS unit 3 with the NFC controller 5, but the control channel 62 now connects the TEE unit 4 with the NFC controller 5. In other words, the control channel endpoint is moved into the TEE unit 4. This provides that the NFCC configuration including the routing configuration and the management of logical connections reside in a more secured environment compared to the OS unit 3. This raises the barrier for malware to access secure elements and the configuration information in the NFC controller 5. The OS unit 3 can still access the control channel 62 through the TEE unit 4 by using a dedicated application programming interface (API) 81.

In order to control access on the control channel and functions the TEE unit 4 may use a policy unit 9 (i.e. a logical component) configured to implement a policy based on a set of rules. The policy may e.g. be predefined, configurable by the user and/or updatable over the air.

The electronic device 10 can control the communication channel establishment but not the data exchanged afterwards since the data channel endpoint is located in the OS unit 3. To overcome this issue, in another embodiment of the device 20 as depicted in FIG. 4 also the data channel 61 ends in the TEE unit 4, i.e. the data channel 61 is provided between the NFC controller 5 and the TEE unit 4.

Since the OS unit 3 and the TEE unit 4 will both access the same hardware, i.e. the physical interface to the NFC controller, a router 7 (e.g. a so called hypervisor) may be used to arbitrate hardware access. The router 7 is provided to route the control channel 62 and the data channel 61 to the TEE unit 4 and OS unit 3, respectively. However, if its behavior can be dynamically updated, it may also be used to route individual or all logical connections as described below.

The OS unit 3 can still access the control channel 62 through the TEE unit 4 by using the API 81. Further APIs 82, 83 are provided between the router 7 on the one hand and the OS unit 3 and the TEE unit 4 on the other hand. An optional hardware abstraction layer (not shown) may be provided for simplifying the interface.

Figure 4:
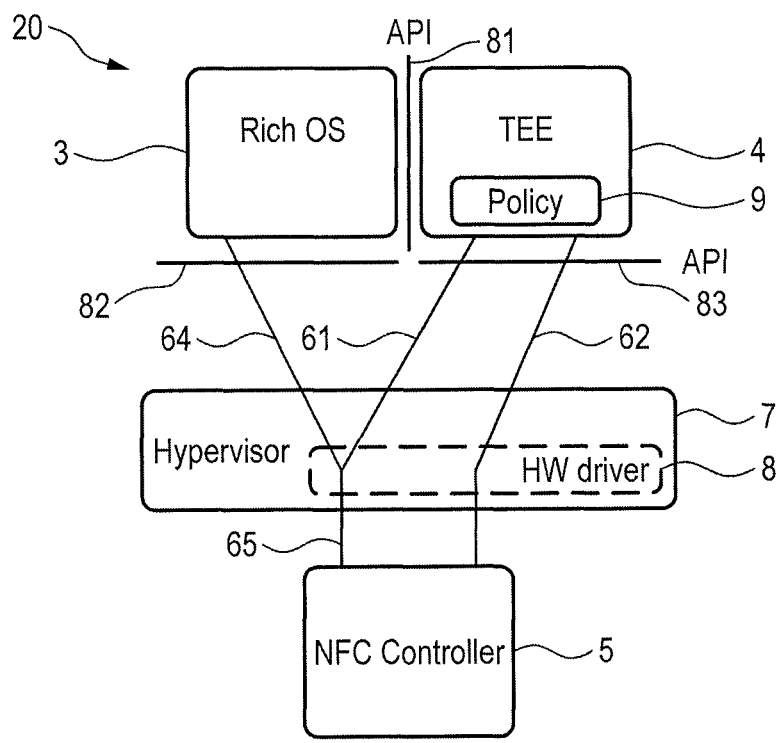
FIG. 4 shows a schematic diagram of a second embodiment of an electronic device according to the present disclosure.

In order to give applications residing on the TEE unit 4 direct access to the data channel 61, the data channel may be split between the TEE unit 4 and the OS unit 3 as provided in the embodiment of the electronic device 20 depicted in FIG. 4. This device comprises a first data channel 64 between the OS unit 3 and the NFC controller 5 and a second data channel 61 between the TEE unit 4 and the NFC controller 5. These two data channels 64, 61 both end in a common third data channel 65 between the router 7 and the NFC controller 5. The control channel 62, however, is unique and only accessible by the TEE unit 4.

Such an implementation requires some changes in the driver layer. Usually, the hardware driver is implemented in the OS unit 3 (as shown in FIG. 3) since it accesses the hardware directly. If the access is moved to the router 7 (i.e. the hypervisor) the hardware driver 8 is moved as well into the router 7 as shown in FIG. 4.

Figure 5:
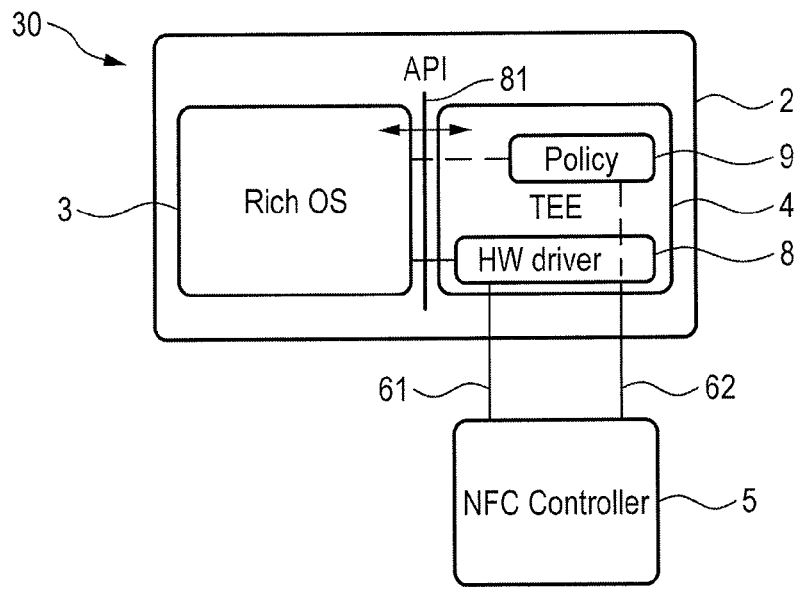
FIG. 5 shows a schematic diagram of a third embodiment of an electronic device according to the present disclosure.

Alternatively, all NCI channels may end at the TEE unit 4 and the OS unit 3 gets access through the API 81 as provided in the embodiment of the electronic device 30 depicted in FIG. 5. The control channel 62 and the data channel 61 are provided between the TEE unit 4 and the NFC controller 5. The OS unit 3 has access to the control channel 62 and the data channel 61 via the API 81 to TEE unit 4. This embodiment further increases the security level for communication channel establishment to other entities within the device and also for the routing configuration.

The device host 2 and the NFC controller 5 may be implemented as separate semiconductor devices, e.g. as electronic host device (or application processor) implementing the device host 2 and an NFC chip implementing the NFC controller 5. Alternatively, the device host 2 and the NFC controller 5 may be implemented on a common semiconductor device (e.g. a common application processor).

Figure 6:
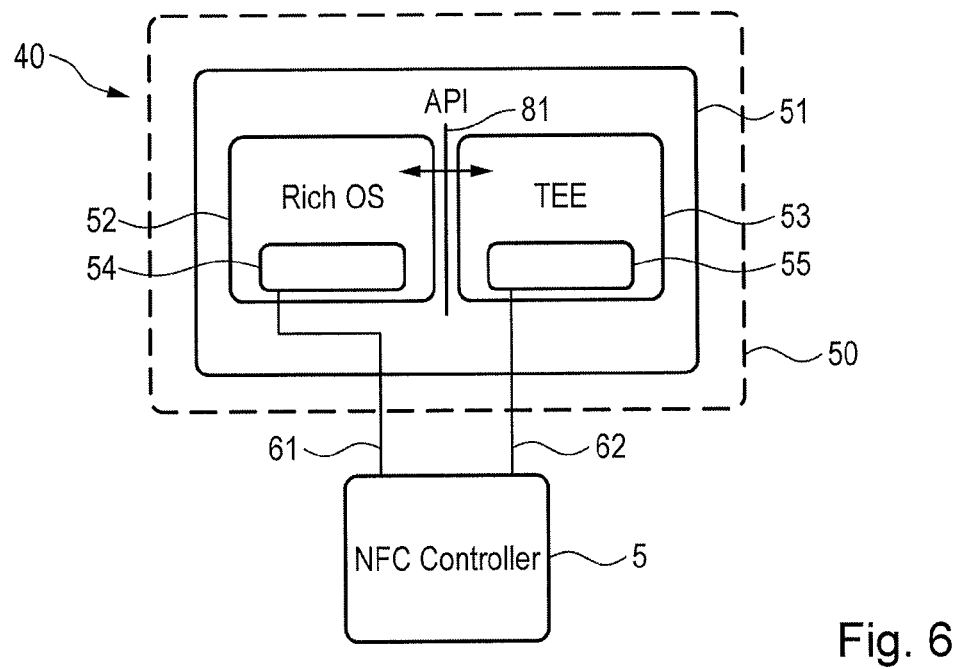
FIG. 6 shows a schematic diagram of a fourth embodiment of an electronic device including an embodiment of an electronic host device according to the present disclosure.

A fourth embodiment of an electronic device 40 including an embodiment a more detailed embodiment of an electronic host device 50, which may be realized as semiconductor element (e.g. as application processor), is schematically depicted in FIG. 6. The electronic host device 50 may e.g. be used as device host in the electronic devices 10, 20, 30 shown in FIGS. 3 to 5. The electronic host device 50 comprises a device host 51 comprising an OS unit 52 and a TEE unit 53. Further, for coupling with the NFC controller 5 a first interface 54 for exchanging data over a data channel provided between the host device 51 (i.e. the OS unit 52 and/or the TEE unit 53) and the NFC controller 5 and a second interface 55 for exchanging control information over a control channel between the TEE unit 53 and the NFC controller 5 are provided. Apart from said slightly different implementation, the function of the electronic host device 50 corresponds to the function explained above for the device host 2.

The first interface 54 is preferably part of the device host 51, in particular of the OS unit 52 in the depicted embodiment, but may also be arranged outside the OS unit 52 or even outside the device host 51. Similarly, the second interface 55 is preferably part of the device host 51, in particular of the TEE unit 53 in the depicted embodiment, but may also be arranged outside the TEE unit 53 or even outside the device host 51.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. An electronic device including:
   a device host including an operating system, OS, unit and a trusted execution environment, TEE, unit, and
   a near field communication, NFC, controller configured to enable communication of the electronic device with other devices, said NFC controller being coupled to the device host by a data channel for data exchange and a control channel for control information exchange,
   wherein the control channel is provided between the TEE unit and the NFC controller.

2. The electronic device as defined in embodiment 1,
   wherein the OS unit is configured to access the control channel only via the TEE unit.

3. The electronic device as defined in any preceding embodiment,
   wherein the TEE unit comprises a policy unit configured to implement a policy based on a set of rules.

4. The electronic device as defined in any preceding embodiment,
   wherein the data channel is provided between the OS unit and the NFC controller.

5. The electronic device as defined in any preceding embodiment,
   further including a router coupled between the device host and the NFC controller configured to route data transferred between the device host and the NFC controller,
   wherein a first data channel is provided between the OS unit and the router, a second data channel is provided between the TEE unit and the router and a third data channel is provided between the router and the NFC controller.

6. The electronic device as defined in embodiment 5,
   wherein the control channel is provided between the TEE unit and the NFC controller via the router.

7. The electronic device as defined in embodiment 5,
   further including a hardware driver provided in the router.

8. The electronic device as defined in any preceding embodiment,
   wherein the data channel is provided between the TEE unit and the NFC controller.

9. The electronic device as defined in any preceding embodiment,
further including a hardware driver provided in the TEE unit.

10. The electronic device as defined in any preceding embodiment,
further including an application programming interface for coupling the TEE unit with the OS unit and for enabling the OS unit to access the control channel.

11. A communication method for an electronic device including a device host including an operating system, OS, unit and a trusted execution environment, TEE, unit, and a near field communication, NFC, controller configured to enable communication of the electronic device with other devices, said method comprising including:
    establishing a data channel between the NFC controller and the device host for enabling data exchange between the NFC controller and the device host,
    establishing a control channel between the NFC controller and the device host for control information exchange, wherein the control channel is established between the TEE unit and the NFC controller.

12. A computer program including program code means for causing a computer to perform the steps of said method according to embodiment 11 when said computer program is carried out on a computer.

13. An electronic host device comprising including:
    a device host including an operating system, OS, unit and a trusted execution environment, TEE, unit,
    a first interface for exchanging data over a data channel provided between the host device and a near field communication, NFC, controller configured to enable communication of the electronic device with other devices, and
    a second interface for exchanging control information over a control channel between the TEE unit and the NFC controller.

The invention claimed is:
1. An electronic device comprising:
    a device host comprising an operating system (OS) and a trusted execution environment (TEE); and
    a near field communication (NFC) controller configured to enable communication of the electronic device with other devices, the NFC controller being coupled to the device host by a data channel to exchange data and a control channel to control information exchange,
    wherein the control channel is coupled to the TEE and the NFC controller rather than to the OS.

2. The electronic device as claimed in claim 1,
wherein the OS is configured to access the control channel only via the TEE.

3. The electronic device as claimed in claim 1,
wherein the TEE comprises a policy unit configured to implement a policy based on a set of rules.

4. The electronic device as claimed in claim 1,
wherein the data channel is provided between the OS and the NFC controller.

5. The electronic device as claimed in claim 1,
further comprising a router coupled between the device host and the NFC controller configured to route data transferred between the device host and the NFC controller,
wherein a first data channel is provided between the OS unit and the router, a second data channel is provided between the TEE unit and the router, and a third data channel is provided between the router and the NFC controller.

6. The electronic device as claimed in claim 5,
wherein the control channel is provided between the TEE and the NFC controller via the router.

7. The electronic device as claimed in claim 5,
further comprising a hardware driver provided in the router.

8. The electronic device as claimed in claim 1,
wherein the data channel is provided between the TEE and the NFC controller.

9. The electronic device as claimed in claim 1,
further comprising a hardware driver provided in the TEE.

10. The electronic device as claimed in claim 1,
further comprising an application programming interface configured to couple the TEE with the OS and to enable the OS to access the control channel.

11. A communication method for an electronic device including a device host including an operating system (OS), a trusted execution environment (TEE), and a near field communication (NFC) controller configured to enable communication of the electronic device with other devices, the method comprising:
    establishing a data channel between the NFC controller and the device host to enable data exchange between the NFC controller and the device host; and
    establishing a control channel between the NFC controller and the device host to control information exchange,
    wherein the control channel is coupled to the TEE and the NFC controller rather than to the OS.

12. A non-transitory computer-readable recording medium that stores therein a computer program product which, when executed by a processor, causes the processor to perform a method for an electronic device comprising a device host including an operating system (OS), a trusted execution environment (TEE), and a near field communication (NFC) controller configured to enable communication of the electronic device with other devices, the method comprising:
    establishing a data channel between the NFC controller and the device host to enable data exchange between the NFC controller and the device host; and
    establishing a control channel between the NFC controller and the device host to control information exchange,
    wherein the control channel is coupled to the TEE and the NFC controller rather than to the OS.

13. An electronic host device comprising:
    a device host comprising an operating system (OS) and a trusted execution environment (TEE);
    a first interface configured to exchange data over a data channel provided between the host device and a near field communication (NFC) controller configured to enable communication of the electronic device with other devices; and
    a second interface configured to exchange control information over a control channel between the TEE and the NFC controller,
    wherein the control channel is coupled to the TEE and the NFC controller rather than to the OS.

* * * * *